UNITED STATES PATENT OFFICE 2,400,394

PROCESS FOR BREAKING PETROLEUM EMULSIONS

Melvin De Groote, University City, and Bernhard Keiser, Webster Groves, Mo., assignors to Petrolite Corporation, Ltd., Wilmington, Del., a corporation of Delaware No Drawing. Application December 14, 1944
Serial No. 568,228

8 Claims. (Cl. 252—344)

This invention relates primarily to the resolution of petroleum emulsions.

The main object of our invention is to provide a novel and efficient process for resolving petroleum emulsions of the water-in-oil type, that are commonly referred to as "cut oil," "roily oil," "emulsified oil," etc., and which comprise fine droplets of naturally-occurring waters or brines dispersed in a more or less permanent state throughout the oil which constitutes the continuous phase of the emulsion.

Another object of our invention is to provide an economical and rapid process for separating emulsions which have been prepared under controlled conditions from mineral oil, such as crude oil and relatively soft waters or weak brines. Controlled emulsification and subsequent demulsification, under the conditions just mentioned, is of significant value in removing impurities, particularly inorganic salts from pipeline oil.

Demulsification, as contemplated in the present application, includes the preventive step of commingling the demulsifier with the aqueous component which would or might subsequently become either phase of the emulsion, in absence of such precautionary measure.

The new chemical product, compound, or material that is used as the demulsifier in the process herein described, consists of the reaction product involving two moles of a 1,2-disubstituted glyoxalidine and one or more moles of urea or the equivalent thereof. The reaction involved eliminates ammonia with the formation of the corresponding substituted urea. Assuming the reaction involves two terminal amino nitrogen groups, it may be indicated, for the sake of brevity, in the following manner:

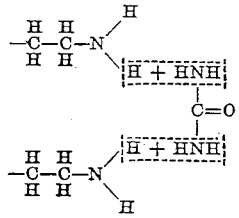

The linkage formed involves two amino nitrogen atoms connected by the divalent carbonyl radical. It is known, however, that two moles of urea may combine to give a mole of biuret, or, if desired, biuret itself may be used to replace urea. Other comparable compounds, as well as biuret, may be used as the obvious equivalent of urea, for instance, thiourea, or guanidine carbonate. As to the use of such other reactants in somewhat analogous reactions, reference is made to U. S. Patent No. 2,304,113, dated December 8, 1942, to Morgan, et al., and U. S. Patent No. 2,304,369, dated December 8, 1942, to Morgan, et al.

As previously suggested, one type of raw material herein contemplated, consists of a cyclic compound having a 5-membered heterocyclic ring with two atoms different from carbon. More specifically, they may be considered as derivatives of imidazole, frequently referred to as glyoxaline. Imidazole (glyoxaline) is indicated by the following formula:

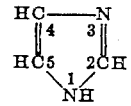

The imidazolines or glyoxalidines may be considered as dihydro-derivatives of imidazole (glyoxaline); and thus the expressions "dihydroglyoxalines" and "glyoxalidines" are often employed. The introduction of two hydrogen atoms at the 4–5 position results in the conversion of imidazole into dihydroglyoxaline, which may be indicated by the following formula:

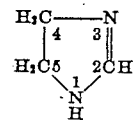

As to the manufacture of imidazolines, reference is made to the following patents: U. S. Patents Nos. 2,215,861, 2,215,862, 2,215,863 and 2,215,864; dated September 24, 1940, to Waldmann and Chwala.

Imidazolines or glyoxalidines may be regarded as dehydration products of certain amides; and they may be obtained by reacting polyamines and the higher carboxylic acids under certain conditions. The formation of these glyoxalidine compounds, while forming no part of the present invention, is indicated by the following scheme:

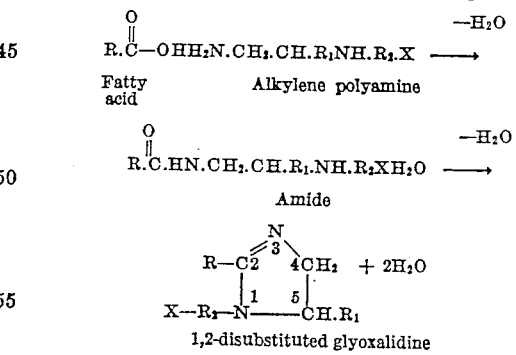

wherein R represents an alkyl or alkenyl group, such as one containing from 10 to 20 carbon atoms (the residue of a higher fatty acid); R₁ represents hydrogen or a lower alkyl group; R₂ represents an alkylene group, or a lower alkyl substituted alkylene group and X represents a hydroxyl group, an amino group, or an aminoalkylene substituted amino group. (See U. S. Patent No. 2,214,152, dated September 10, 1940, to Wilkes. Also see U. S. Patents Nos. 2,155,877 and 2,155,878, both dated April 25, 1939, to Waldmann and Chwala.)

The expression "higher molecular weight carboxy acids" is an expression frequently employed to refer to certain organic acids, particularly monocarboxy acids, having more than six carbon atoms, and generally, less than 40 carbon atoms. The commonest examples include the detergent-forming acids, i. e., those acids which combine with alkalies to produce soap or soap-like bodies. The detergent-forming acids, in turn, include naturally-occurring fatty acids, resin acids, such as abietic acid, naturally-occurring petroleum acids, such as naphthenic acids, and carboxy acids produced by the oxidation of petroleum. As will be subsequently indicated, there are other acids which have somewhat similar characteristics and are derived from somewhat different sources, and are different in structure, but can be included in the broad generic term, previously indicated.

Among sources of such acids may be mentioned straight chain and branched chain, saturated and unsaturated, carboxylic, aliphatic, alicyclic, fatty, aromatic, hydroaromatic, and aralkyl acids, including caprylic acid, heptylic acid, caproic acid, capric acid, pimelic acid, sebacic acid, erucic acid, saturated and unsaturated higher molecular weight aliphatic acids, such as the higher fatty acids containing at least eight carbon atoms, and including, in addition to those mentioned, melissic acid, stearic acid, oleic acid, ricinoleic acid, diricinoleic acid, tiricinoleic acid, polyricinoleic acid, ricinostearolic acid, ricinoleyl lactic acid, acetylricinoleic acid, chloracetylricinoleic acid, linoleic acid, linolenic acid, lauric acid, myristic acid, undecylenic acid, palmitic acid, mixtures of any two or more of the above mentioned acids or other acids, mixed higher fatty acids derived from animal or vegetable sources, for example, lard, cocoanut oil, rapeseed oil, sesame oil, palm kernel oil, palm oil, olive oil, corn oil, cottonseed oil, sardine oil, tallow, soyabean oil, peanut oil, castor oil, seal oils, whale oil, shark oil and other fish oils, teaseed oil, partially or completely hydrogenated animal and vegetable oils, such as those mentioned; hydroxy and alphahydroxy higher carboxylic, aliphatic and fatty acids, such as hydroxystearic acid, dihydroxypalmitic acid, dihydroxystearic acid, dihydroxybehenic acid, alpha-hydroxy capric acid, alpha-hydroxystearic acid, alpha-hydroxy palmitic acid, alpha-hydroxy lauric acid, alpha-hydroxy myristic acid, alpha-hydroxy cocoanut oil mixed fatty acids, alpha-hydroxy margaric acid, alpha-hydroxy arachidic acid, and the like, fatty and similar acids derived from various waxes, such as beeswax, spermaceti, montan wax, Japan wax, coccerin, and carnauba wax. Such acids include carnaubic acid, cerotic acid, lacceric acid, montanic acid, psyllastearic acid, etc. As suggested, one may also employ higher molecular weight carboxylic acids, derived by oxidation and other methods, from paraffin wax, petroleum and similar hydrocarbons; resinic and hydroaromatic acids, such as hexahydrobenzoic acid, hydrogenated naphthoic, hydrogenated carboxy-diphenyl, naphthenic, and abietic acid; aralkyl and aromatic acids, such as hexahydrobenzoic acid, hydrogenated naphthoic, hydrogenated polycarboxy-diphenyl, naphthenic, and abietic acid; aralkyl and aromatic acids, such as benzoic acid, Twitchell fatty acids, naphthoic acid, carboxy-diphenyl, pyridine carboxylic acid, hydroxy-benzoic acid, and the like.

Other suitable acids include phenylstearic acid, benzoylnonylic acid, campholic acid, fencholic acid, cetyloxybutyric acid, cetyloxyacetic acid, chlorstearic acid, etc.

Another source of suitable acids are those commonly referred to as lac acids, such, for example, as the acids derived from shellac. Such acids include various polyhydroxy acids, for example, aleuritic acid, shelloic acid, and kerrolic acid.

The preferred aspect of our invention is concerned with the use of compounds derived from detergent-forming monocarboxy acids, which include those previously described having at least 8 carbon atoms and not more than 32 carbon atoms. The preferred reagent in this particular case consists of the higher fatty acids, and more especially, the unsaturated, higher fatty acids.

In order to illustrate the invention, the following examples are given of procedures that we have employed to produce the new compound or material that is used as the demulsifier of our process, although obvious varieties can be prepared in light of the class of reagents previously enumerated.

*Example 1*

1-aminoethyl-2-heptadecenyl glyoxalidine was prepared by mixing 1 gram mole (282 grams) of oleic acid, with 2 gram moles (206 grams) of diethylene triamine, and heating the mixture for a period of about 16 hours, under a distilling column. Water was continuously removed until a temperature of about 245° C. was reached. The quantity of water thus removed amounted to about 1.7 moles. Unreacted diethylene triamine was distilled from the reaction mixture under vacuum, and the residue then was purified by distillation at an absolute pressure of 1 mm. of mercury, at which point it boiled within a temperature range of 225° to 250° C. About 220 grams of the 1-aminoethyl-2-heptadecyl glyoxalidine was obtained as a pale yellow liquid.

2 lbs. moles of the above product are mixed with 1 lb. mole of urea and heated at a temperature within the range of 120° C. to approximately 160° C. until 2 moles of ammonia are eliminated. This requires approximately 20 minutes to 1 hour. The product so obtained is somewhat darker in appearance, and much more viscous than the product prior to reaction with urea. It is soluble in water, dilute acids, etc.

*Example 2*

The same procedure is followed as in the preceding example, except that a different disubstituted glyoxalidine is employed, to wit, 1-(aminoethyl ethylamino)-2-heptadecenyl glyoxalidine. This glyoxalidine was prepared by reacting 1 gram mole of oleic acid with 3 gram moles (438 grams) of triethylene tetramine.

The molal ratio of glyoxalidine to urea is left unchanged.

Example 3

Tetraethylenepentamine is substituted for triethylene tetramine as a reactant in the preceding example.

Example 4

Lauric acid is substituted as a reactant for oleic acid in the three preceding examples.

Example 5

Ricinoleic acid is substituted for oleic acid in Examples 1-3, preceding.

Example 6

Naphthenic acid is substituted for oleic acid in Examples 1-3, preceding.

Example 7

The same procedure is followed as in Examples 2 to 6, inclusive, except the molal ratio of urea is doubled.

Example 8

The same procedure is followed as in Examples 2 to 6, inclusive, except that the molal ratio of urea is tripled.

Example 9

The same procedure is followed as in Examples 1 to 6, inclusive, except that thiourea, biuret or guanidine carbonate is substituted for urea.

Attention is directed to the fact that products of the kind described show unusual resistance to hydrolysis in strong acid solution, and thus, are particularly differentiated from somewhat similar compounds in which the high molal group derived, for example, from a fatty acid is present in ester or amide form. This makes the compounds herein contemplated particularly effective for use as inhibitors in acid solution, for the formation of acid fluxes, and particularly for use in preventing emulsions in connection with the acidification of calcareous acid structure, as contemplated in our co-pending application Serial No. 568,229, filed December 14, 1944.

It has been previously pointed out that where urea is employed in the proportion of one mole of urea for 2 of the glyoxalidine, that the structure involves a linkage, such as the following:

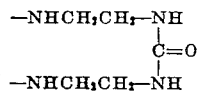

When, however, 2 moles of urea are employed for 2 moles of the glyoxalidine, a variety of other structures may enter into the combination, as, for example, the formation of biuret, with the result that there appears a linkage such as the following:

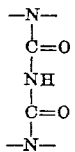

However, cyclic structures may be formed, due to the formation of 2 cross-linked structures, as indicated by the following:

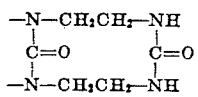

It is entirely possible, however, and seems indicated by some of the thick, resinous products formed, that polymerization occurs when the higher proportions of urea, or its equivalent is employed, due to the formation of a structure, as indicated in the following manner:

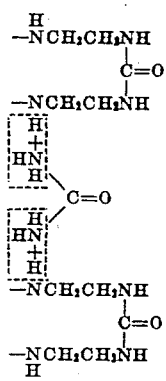

As far as we are aware, the reaction involving two moles of the glyoxalidine and 1 mole of the urea, involves the terminal primary amino radicals. When additional linkages are formed, as indicated, provided that such linkages may take place in more than 1 position, we are unaware as to the factors which determine the particular point of reaction.

In order to properly designate the herein contemplated compounds, we have referred to them as substituted carbamyl compounds containing at least 2 radicals of the 1,2-disubstituted glyoxalidine.

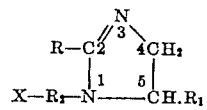

wherein R represents an alkyl or alkenyl group, such as one containing from 10 to 20 carbon atoms (the residue of a higher fatty acid or its equivalent); $R_1$ represents hydrogen or a lower alkyl group; $R_2$ represents an alkylene group or a lower alkyl substituted alkylene group; and X represents a member of the class consisting of amino groups and amino-alkylene, substituted amino groups, and having at least one occurrence of a divalent radical selected from the class consisting of:

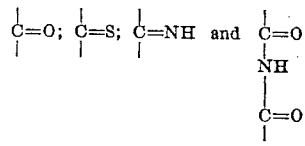

radicals, and the aforementioned divalent radical uniting the glyoxalidine radicals by being linked to nitrogen atoms.

Compounds of the type herein described are basic in form, and it is understood that reference in the claims includes the free base, i. e., the anhydro form, or the hydrated base formed by combination with water or salts formed by combination with organic or inorganic acids, such as citric acid, lactic acid, hydroxyacetic acid, nitric acid, hydrochloric acid, etc.

Attention is directed to U. S. Patent No. 2,353,706, dated July 18, 1944, to De Groote & Keiser. Said patent describes the oxyalkylation, and particularly, the oxyethylation of 1,2-disubstituted glyoxalidine of the type herein contemplated as reactants. It is understood that the products herein contemplated may be subjected to oxyethylation under the same conditions, and in the same manner, and in the same molal ratio as the simpler 1,2-disubstituted glyoxalidine described in the aforementioned U. S. Patent No. 2,353,706. Furthermore, one may react the oxyalkylated 1,2-disubstituted glyoxalidine with urea, thiourea, or other reactants of the kind herein described, and obtain somewhat analogous compounds, although the reactions appear to be complicated by the fact that reactions involving the following groups appear to take place to a greater or lesser degree, particularly when both hydrogen atoms attached to the terminal amino nitrogen atoms have been subjected to oxyethylation, as indicated in the following manner:

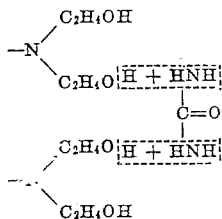

The above product appears to form linkages which represent a particular type of carbonic acid ester.

However, when there is one hydrogen atom attached to an amino nitrogen atom available for reaction, the following reaction appears to predominate:

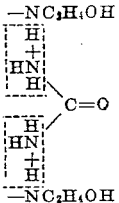

In this instance the final product appears largely to conform to that obtained by initial reaction with urea, followed by oxyethylation as a subsequent step. Oxyalkylation, particularly oxyethylation, need not be limited to 2 amino radicals, but may be employed for the modification of a single amino radical, or for more than 2 amino radicals. There must be a hydrogen atom attached to the amino radical, i. e., the amino radical must be primary or secondary, in order to be susceptible to oxyalkylation.

In its broadest aspect, the present invention contemplates such variants in which the imidazoline radical contains a group selected from the class consisting of

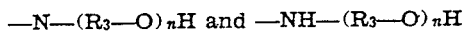
—N—(R₃—O)ₙH and —NH—(R₃—O)ₙH groups; wherein R₃ denotes an aliphatic radical and $n$ is a small whole number greater than 2 and less than 11; or the equivalent radicals previously mentioned in connection with hydroxyethylene derivatives, and which may be indicated in a broader aspect by the following structure:

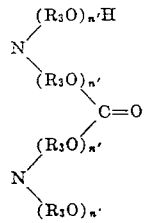

wherein R₃ has its previous significance and $n'$ is a small whole number less than 11. R₃ particularly represents alkylene radicals having 2 to 4 carbon atoms, such as the ethylene radical, propylene radical, butylene radical, glycide radical and methyl glycide radical.

Conventional demulsifying agents employed in the treatment of oil field emulsions are used as such, or after dilution with any suitable solvent, such as water; petroleum hydrocarbons, such as gasoline, kerosene, stove oil; a coal tar product, such as benzene, toluene, xylene, tar acid oil, cresol, anthracene oil, etc. Alcohols, particularly aliphatic alcohols, such as methyl alcohol, ethyl alcohol, denatured alcohol, propyl alcohol, butyl alcohol, hexyl alcohol, octyl alcohol, etc., may be employed as diluents. Miscellaneous solvents, such as pine oil, carbon tetrachloride, sulfur dioxide extract obtained in the refining of petroleum, etc., may be employed as diluents. Similarly, the material or materials employed as the demulsifying agent of our herein described process for breaking petroleum emulsions, may be admixed with one or more of the solvents customarily used in connection with conventional demulsifying agents. Moreover, said material or materials may be used alone, or in admixture with other suitable well-known classes of demulsifying agents.

It is well known that conventional demulsifying agents may be used in a water-soluble form, or in an oil-soluble form, or in a form exhibiting both oil and water solubility. Sometimes they may be used in a form which exhibits relatively limited oil solubility. However, since such reagents are sometimes used in a ratio of 1 to 10,000, or 1 to 20,000, or even 1 to 30,000, or even 1 to 40,000, or 1 to 50,000, in desalting practice, such an apparent insolubility in oil and water is not significant, because said reagents undoubtedly have solubility within the concentration employed. This same fact is true in regard to the material or materials employed as the demulsifying agent of our process.

We desire to point out that the superiority of the reagent or demulsifying agent contemplated in our process, is based upon its ability to treat certain emulsions more advantageously and at a somewhat lower cost than is possible with other available demulsifiers, or conventional mixtures thereof. It is believed that the particular demulsifying agent or treating agent herein described will find comparatively limited application, so far as the majority of oil field emulsions are concerned; but we have found that such a demulsifying agent has commercial value, as it will economically break or resolve oil field emulsions in a number of cases which cannot be treated as easily or at so low a cost with the demulsifying agents heretofore available.

In practising our process for resolving petroleum emulsions of the water-in-oil type, a treating agent or demulsifying agent of the kind above described is brought into contact with or caused to act upon the emulsion to be treated, in any of the various apparatus now generally used to resolve or to break petroleum emulsions with a chemical reagent, the above procedure being used either alone, or in combination with other demulsifying procedure, such as the electrical dehydration process.

The demulsifer herein contemplated may be employed in connection with what is commonly known as down-the-hole procedure, i. e., bringing the demulsifier into contact with the fluids of the well at the bottom of the well, or at some point prior to the emergency of said fluids. This particular type of application is decidedly feasible, when the demulsifier is used in connection with acidification of calcareous oil-bearing strata, especially if suspended in or dissolved in the acid employed for acidification.

A somewhat analogous use of our demulsifying agent is the removal of a residual mud sheath which remains after drilling a well by the rotary method. Sometimes the drilling mud contains added calcium carbonate, or the like, to render the mud susceptible to reaction with hydrochloric acid, or the like, and thus expedite its removal.

The new composition of matter and method of making same herein described, constitutes the subject-matter of our divisional application Serial No. 596,398, filed May 28, 1945.

Having thus described our invention, what we claim as new and desire to secure by Letters Patent is:

1. A process for breaking petroleum emulsions of the water-in-oil type, characterized by subjecting the emulsion to the action of a demulsifier comprising a member of the class consisting of: (A) substituted carbamyl compounds containing at least 2 glyoxalidine radicals; said glyoxalidine radicals being the radical of a 1,2-disubstituted glyoxalidine of the structure

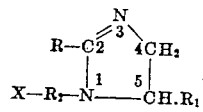

wherein R is the radical of the detergent-forming monocarboxy acid having at least 8 and not more than 32 carbon atoms; $R_1$ is a member of the class consisting of hydrogen atoms and lower alkyl radicals; $R_2$ is a member of the class consisting of alkylene radicals and lower alkyl substituted alkylene radicals; X is a member of the class consisting of hydroxyl radicals, amino radicals and amino alkylene-substituted amino radicals; in said carbamyl compound the aforementioned 1,2-disubstituted glyoxalidine radicals being united by a least one member selected from the class consisting of the divalent

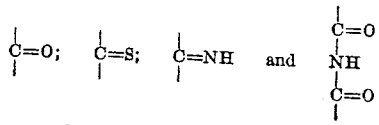

radicals; and the aforementioned divalent radical uniting the glyoxalidine radicals by being linked to nitrogen atoms; and (B) oxyalkylated derivatives of the aforementioned carbamyl compounds in which there is at least one occurrence of the radical $(R_3O)_{n'}$, in which $R_3$ represents an alkylene radical having 2 to 4 carbon atoms and $n'$ is a small whole number less than 11.

2. The process of claim 1, wherein R is the radical of a higher fatty acid.

3. The process of claim 1, wherein R is the radical of higher fatty acid having 18 carbon atoms.

4. The process of claim 1, wherein R is the radical of an unsaturated higher fatty acid having 18 carbon atoms.

5. The process of claim 1, wherein R is the radical of an unsaturated, higher fatty acid having 18 carbon atoms, and the ratio of glyoxalidine radicals to radicals selected from the class consisting of

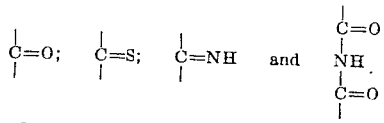

radicals being 2 to 1.

6. The process of claim 1, wherein R is the radical of an unsaturated, higher fatty acid having 18 carbon atoms; the ratio of glyoxalidine radicals to radicals selected from the class consisting of:

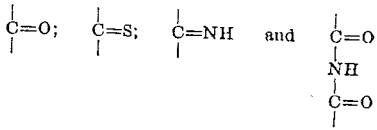

radicals being 2 to 1, and the number of nitrogen atoms in each glyoxalidine radical being 3.

7. The process of claim 1, wherein R is the radical of an unsaturated higher fatty acid having 18 carbon atoms; the ratio of glyoxalidine radicals to radicals selected from the class consisting of

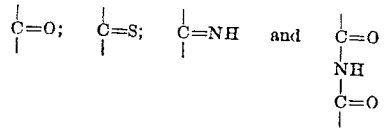

radicals being 2 to 1, and the number of nitrogen atoms in each glyoxalidine radical being 4.

8. The process of claim 1, wherein R is the radical of an unsaturated higher fatty acid having 18 carbon atoms; the ratio of glyoxalidine radicals to radicals selected from the class consisting of:

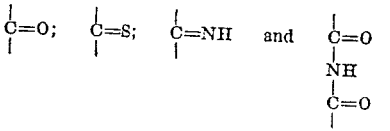

radicals being 2 to 1, and the number of nitrogen atoms in each glyoxalidine radical being 5.

MELVIN DE GROOTE.
BERNHARD KEISER.